(12) United States Patent
Rao

(10) Patent No.: US 9,201,849 B2
(45) Date of Patent: Dec. 1, 2015

(54) IMPLEMENTING MODIFIED QR DECOMPOSITION IN HARDWARE

(71) Applicant: National Instruments Corporation, Austin, TX (US)

(72) Inventor: Yong Rao, Round Rock, TX (US)

(73) Assignee: National Instruments Corporation, Austin, TX (US)

(*) Notice: Subject to any disclaimer, the term of this patent is extended or adjusted under 35 U.S.C. 154(b) by 329 days.

(21) Appl. No.: 13/865,357

(22) Filed: Apr. 18, 2013

(65) Prior Publication Data

US 2014/0214910 A1 Jul. 31, 2014

Related U.S. Application Data

(60) Provisional application No. 61/758,357, filed on Jan. 30, 2013.

(51) Int. Cl.
*G06F 17/10* (2006.01)
*G06F 17/16* (2006.01)

(52) U.S. Cl.
CPC ..................... *G06F 17/16* (2013.01)

(58) Field of Classification Search
None
See application file for complete search history.

(56) References Cited

U.S. PATENT DOCUMENTS

| 8,539,016 | B1* | 9/2013 | Langhammer | 708/520 |
| 8,812,576 | B1* | 8/2014 | Mauer | 708/520 |
| 2010/0138631 | A1* | 6/2010 | Gangalakurti et al. | 712/7 |
| 2012/0078988 | A1* | 3/2012 | Miller | 708/322 |
| 2014/0214910 | A1* | 7/2014 | Rao | 708/208 |
| 2014/0214911 | A1* | 7/2014 | Rao | 708/208 |

OTHER PUBLICATIONS

Luethi et al.; "Gram-Schmidt-based QR Decomposition for MIMO Detection: VLSI Implementation and Comparison;" IEEE Asia Pacific Conference on Circuits and Systems, Nov. 30-Dec. 3, 2008, E-ISBN: 978-1-4244-2342-2; pp. 830-833.

Ganchosov et al.; "FPGA Implementation of Modified Gram-Schmidt QR-Decomposition;" 3rd International Conference on High Performance and Embedded Architectures and Compilers (HiPEAC) Workshop on Reconfigurable Computing; Jan. 2009; pp. 41-51.

(Continued)

*Primary Examiner* — David H Malzahn
(74) *Attorney, Agent, or Firm* — Meyertons Hood Kivlin Kowert & Goetzel, P.C.; Jeffrey C. Hood; Mark S. Williams

(57) ABSTRACT

System and method for computing QR matrix decomposition and inverse matrix $R^{-1}$. A circuit is configured to implement a QR decomposition of a matrix A into two matrices Q and R using a Modified Gram Schmidt (MGS) process. The circuit includes a specified portion dedicated to computing matrix Q. Matrix Q is computed via the specified portion based on first inputs using the MGS process, where the first inputs include the matrix A and possibly a scaling factor σ. The identity matrix may be scaled by the scaling factor σ, thereby generating scaled identity matrix σI. Scaled matrix $\sigma R^{-1}$ (or unscaled $R^{-1}$) may be computed via the specified portion based on second inputs provided to the portion using the MGS process, where the second inputs include the (possibly scaled) identity matrix. If scaled, the scaled matrix $\sigma R^{-1}$ may be unscaled, thereby computing matrix $R^{-1}$. Matrix $R^{-1}$ is stored and/or output.

24 Claims, 15 Drawing Sheets

(56) References Cited

OTHER PUBLICATIONS

Huang, Zheng-Yu; Tsai, Pei-Yun; "High-Throughput QR Decomposition for MIMO Detection in OFDM Systems;" Proceedings of IEEE International Symposium on Circuits and Systems (ISCAS), May 30-Jun. 2, 2010, E-ISBN: 978-1-4244-5309-2; pp. 1492-1495.

Singh et al.; "VLSI Architecture for Matrix Inversion using Modified Gram-Schmidt based QR Decomposition;" Proceedings of the 20th IEEE International Conference on VLSI Design, Jan. 6-20, 2007; pp. 836-841.

* cited by examiner

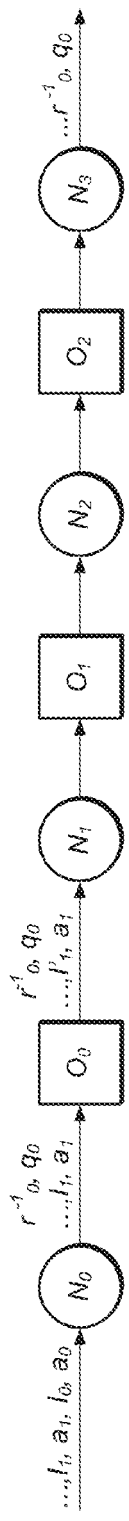
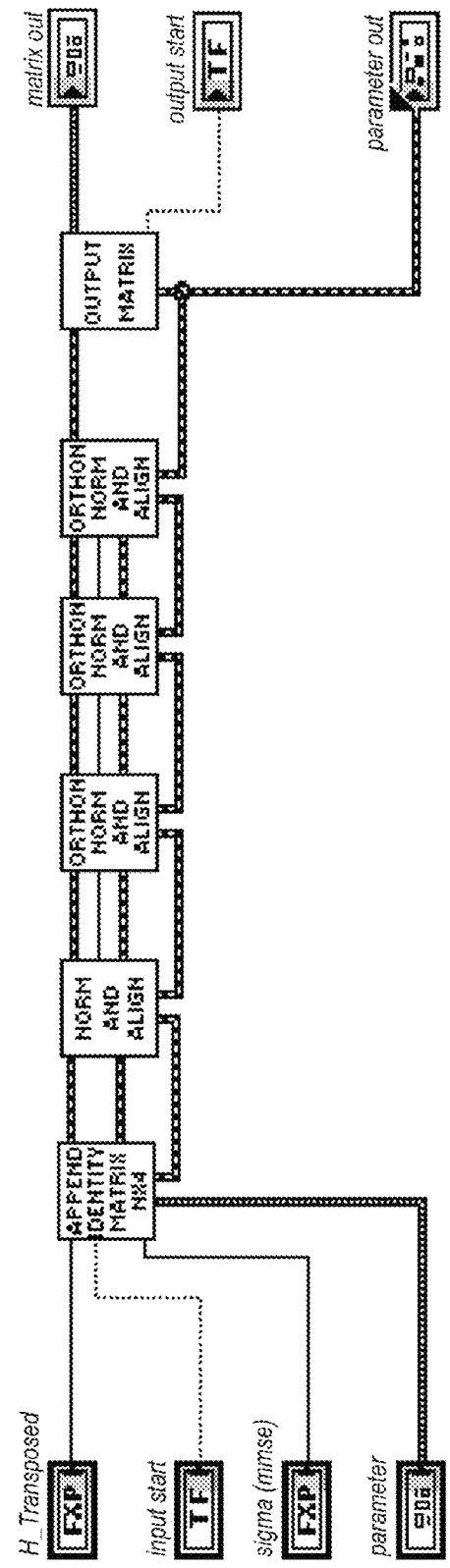
*Figure 11A*
*Figure 11B*

IMPLEMENTING MODIFIED QR DECOMPOSITION IN HARDWARE

PRIORITY DATA

This application claims benefit of priority to U.S. Provisional Application Ser. No. 61/758,357, titled "Implementing Modified QR Decomposition in Hardware", filed Jan. 30, 2013, whose inventor was Yong Rao, which is hereby incorporated by reference in its entirety as though fully and completely set forth herein.

FIELD OF THE INVENTION

The present invention relates to the field of hardware design and implementation, and more particularly to hardware implementation of QR decomposition of a matrix and the corresponding inverse matrix $R^{-1}$.

DESCRIPTION OF THE RELATED ART

QR decomposition, also called QR factorization, is a ubiquitous linear algebra function that is fundamental to solving a myriad of engineering and scientific problems, including telecommunications and discrete modeling, among others, and involves decomposition of a matrix A into a product of two matrices, Q and R, where Q represents or specifies an orthonormal basis that spans the column space of A, and where R is a triangular matrix. Note that the fact that R is triangular facilitates solution of systems of equations associated with the expression (matrix A)(vector x)–(vector b), e.g., via back substitution, in that the single-term (bottom) row (equation) may be used to solve the two-term (next-to-bottom) row, and so forth.

The following illustrates QR decomposition for an P×N matrix A, where P>=N, and in this particular case, equals 4, where A=QR, and where terms $\bar{a}_j$ and $\bar{q}_i$ are respective column vectors of A and Q, with Q's column vectors being mutually orthonormal:

$$[\bar{a}_0 \ \bar{a}_1 \ \bar{a}_2 \ \bar{a}_3] = [\bar{q}_0 \ \bar{q}_1 \ \bar{q}_2 \ \bar{q}_3] \times \quad (1)$$

$$\begin{bmatrix} \bar{q}_0 * \bar{a}_0 & \bar{q}_0 * \bar{a}_1 & \bar{q}_0 * \bar{a}_2 & \bar{q}_0 * \bar{a}_3 \\ 0 & \bar{q}_1 * \bar{a}_1 & \bar{q}_1 * \bar{a}_2 & \bar{q}_1 * \bar{a}_3 \\ 0 & 0 & \bar{q}_2 * \bar{a}_2 & \bar{q}_2 * \bar{a}_3 \\ 0 & 0 & 0 & \bar{q}_3 * \bar{a}_3 \end{bmatrix}$$

Note that as used herein, the superscripted asterisk symbol "*" indicates a Hermitian conjugate, i.e., the conjugate transpose, of a matrix. One commonly used method for implementing QR decomposition in hardware, e.g., on a field programmable gate array (FPGA), application specific integrated circuit (ASIC), etc., is the Modified Gram Schmidt (MGS) procedure (i.e., algorithm or technique), expressed below in pseudo-code:

```
for i=0 to N−1 r_ii := ||ā_i||,  ||q̄_i|| := ā_i / ||ā_i|| for j=i+1 to N−1
        r_ij := q̄_i * ā_j
        ā_j := ā_j − r_ij q̄_i
    end
end
``` where, as noted above, $\bar{a}_j$ and $\bar{q}_i$ are respective column vectors, and the superscripted asterisk symbol "*" indicates a Hermitian conjugate (conjugate transpose).

FIG. 1 illustrates the first iteration of the above MGS procedure geometrically, where, for example, vector $\bar{a}_i'$, which refers to updated vector $\bar{a}_i$ in the loop, is determined by projecting vector $\bar{a}_i$ orthogonally onto the subspace generated or represented by vectors $\bar{q}_i, \ldots, \bar{q}_n$, and where vector $\bar{a}_1'$ is defined to be the difference between vector $\bar{a}_1$ and its projection onto $\bar{q}_0$. This value is then utilized in the subsequent iteration to determine the next value, and so forth.

In cases where precision can be traded off in order to achieve higher throughputs, lower latencies, or lower power consumption, fixed-point hardware implementation of the QR decomposition may be desirable, and has been studied extensively in the past. In prior art implementations, the use of the R matrix, e.g., for solution of linear equations, has always been an explicit and separate step from the computation of the Q matrix, and is typically performed via back-substitution, which means that additional hardware circuitry is dedicated to this step, and may not be desirable when hardware resources/area is of primary concern.

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

SUMMARY OF THE INVENTION

Various embodiments of a system and method for implementing QR decomposition and computing inverse matrix $R^{-1}$ are presented below.

An interesting property of the Modified Gram-Schmidt algorithm is exploited to derive the $R^{-1}$ matrix (inverse of matrix R) using the same circuitry used to compute the Q matrix, which allows reuse of the same hardware for both of these operations, hence saving valuable hardware real estate. The merits of this approach are demonstrated below through various applications of the QR decomposition, including solving for linear equations, and implementing a multi-input, multi-output (MIMO) minimum mean square error (MMSE) detector.

Accordingly, embodiments of a method for performing QR decomposition and computing inverse matrix $R^{-1}$ are presented.

First, a circuit may be provided, where the circuit is configured to implement a QR decomposition of a matrix A into two matrices Q and R using a Modified Gram Schmidt (MGS) process, where Q represents an orthonormal basis that spans a column space of A, and where R is a triangular matrix. The circuit may include a specified set of hardware components dedicated to computing matrix Q. In other words, a specified portion of the circuit may be dedicated specifically to computation of the matrix Q, i.e., a particular portion of the circuit is devoted specifically to determining or computing the matrix Q.

A first set of inputs may be provided to the circuit, where the first set of inputs may include the matrix A and a scaling factor σ. In other words, the matrix A and scaling factor σ may be received to or by the circuit. Note, however, that in some embodiments, there may be no scaling, and so either no scaling factor may be provided (or it may be set to 1). In some embodiments, the first set of inputs may include additional input data, e.g., the size of the matrix A, etc., as desired.

Matrix Q may be computed via the specified set of hardware components (or circuit portion) dedicated to computing matrix Q, based on the first set of inputs using the MGS process. The computed matrix Q may be output and/or stored, e.g., in a register or other memory of the circuit, or in a memory external to the circuit, e.g., for subsequent use, as described below. The identity matrix may be scaled by the scaling factor σ, thereby generating scaled identity matrix σI. In embodiments without scaling, this method element may be omitted.

A second set of inputs may be provided to the specified set of hardware components dedicated to computing matrix Q, where the second set of inputs is different from the first set of inputs, and where the second set of inputs includes the scaled identity matrix. In other words, the specified set of hardware components (or circuit portion) dedicated to computing matrix Q may receive the second set of inputs. Of course, in embodiments without scaling, the identity matrix is not scaled. In some embodiments, the identity matrix may have been stored or even hard-wired in the circuit, and thus provided (possibly after scaling) to the specified set of hardware components dedicated to computing matrix Q from inside the circuit. In another embodiment, the identity matrix may be provided to the circuit from an external source or memory. In a further embodiment, the scaling may be performed by the specified set of hardware components (or circuit portion) dedicated to computing matrix Q, and so the specified set of hardware components (or circuit portion) may receive the unscaled identity matrix I as input, and scale it.

Scaled matrix $\sigma R^{-1}$ may be computed via the specified set of hardware components dedicated to computing matrix Q, based on the second set of inputs using the MGS process, and the scaled matrix $\sigma R^{-1}$ may be unscaled, thereby computing matrix $R^{-1}$, where matrix $R^{-1}$ is the inverse of matrix R. Of course, in embodiments without scaling, this method element may be omitted. The matrix $R^{-1}$ may be output and/or stored, e.g., in a register or other memory of the circuit, or in a memory external to the circuit.

Thus, the portion of the circuit dedicated to computing matrix Q may be repurposed to compute (possibly scaled) matrix $R^{-1}$ simply by providing different input values or parameters to the portion, thus, obviating additional circuitry that would otherwise be required to compute the (possibly scaled) matrix $R^{-1}$, and thereby decreasing the footprint or size, and corresponding circuit components, and thus cost.

BRIEF DESCRIPTION OF THE DRAWINGS

A better understanding of the present invention can be obtained when the following detailed description of the preferred embodiment is considered in conjunction with the following drawings, in which:

FIGS. 11A and 11B respectively illustrate an N×4 sequential (non-parallel) QR decomposition process and a corresponding graphical program implementation, according to one embodiment;

Figure 1:
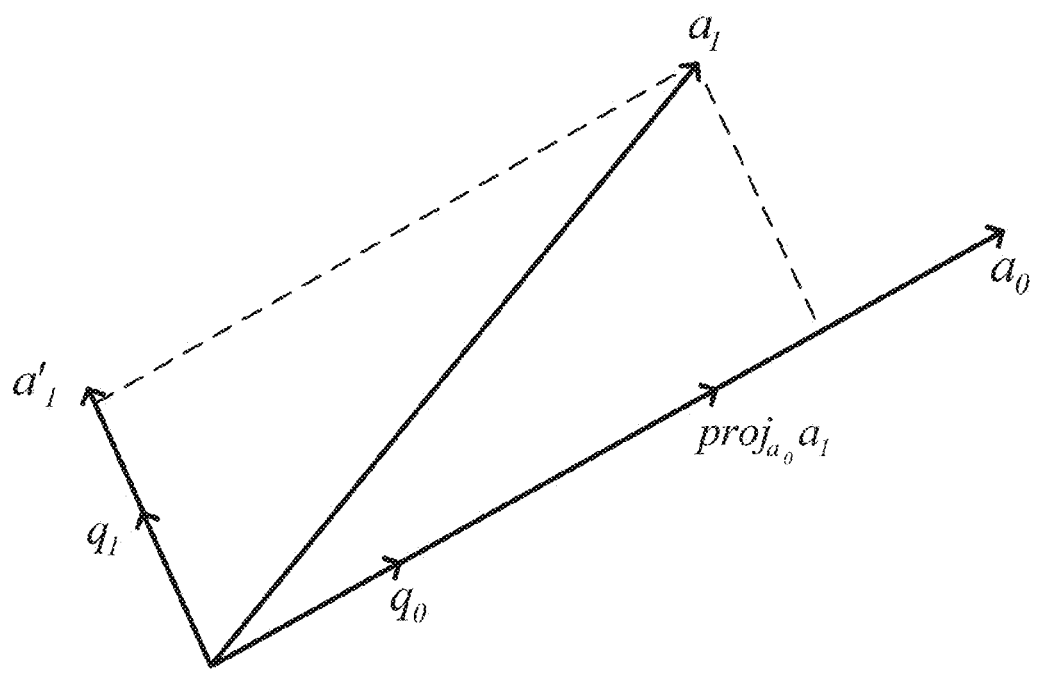
FIG. 1 geometrically illustrates one iteration of the Modified Gram Schmidt procedure, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Provisional Application Ser. No. 61/758,357, titled "Implementing Modified QR Decomposition in Hardware", filed Jan. 30, 2013, whose inventor was Yong Rao.

Rao, Yong; Wong, Ian; "A Novel Architecture for QR Decomposition" by Yong Rao and Ian Wong, of National Instruments Corporation.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform.

For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2A:
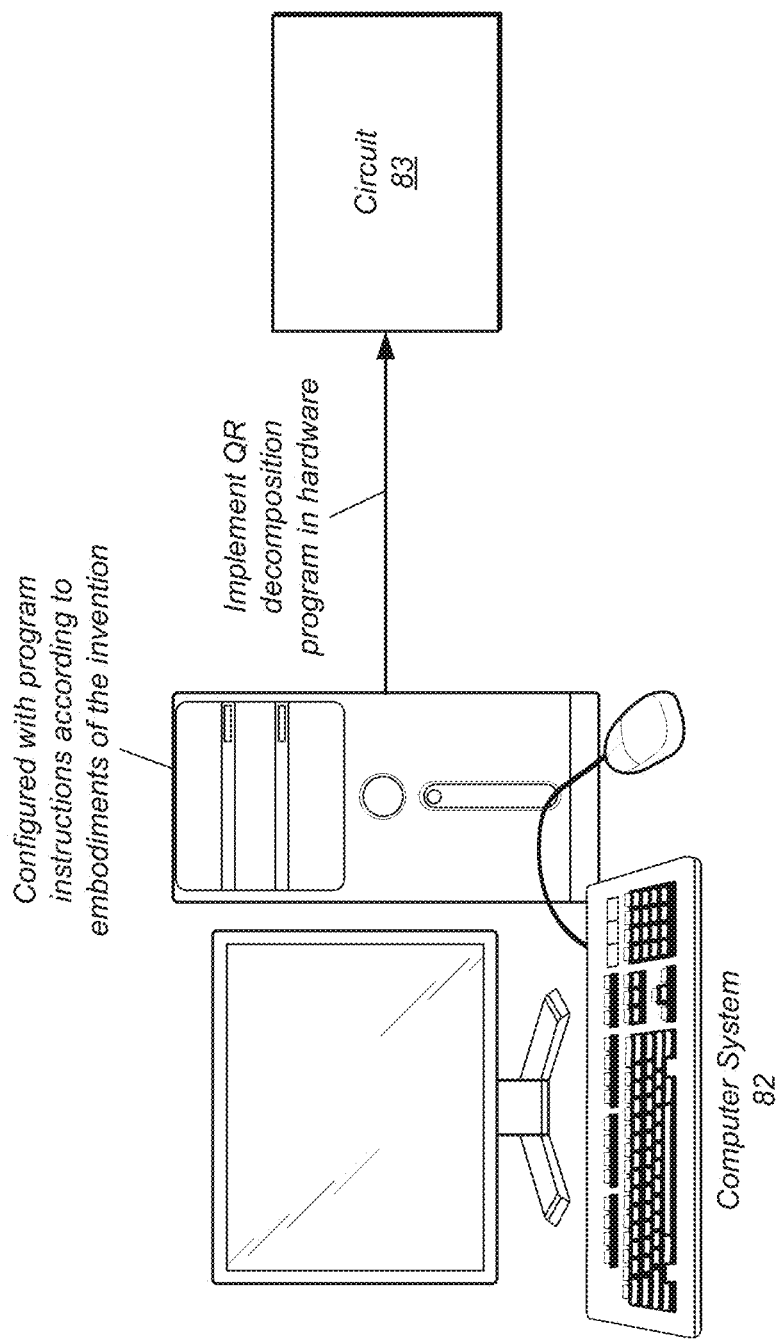
FIG. 2A illustrates a computer system configured to execute a graphical program according to an embodiment of the present invention.

FIG. 2A—Computer System

FIG. 2A illustrates a computer system 82 configured to implement embodiments of the techniques disclosed herein. For example, the computer system 82 may be configured to specify a program, e.g., a graphical program, which is configured to implement QR decomposition and to determine $R^{-1}$ or other industrially useful computations via the same program code. The program may be used to configure a circuit, such as an ASIC or programmable hardware element, e.g., an FPGA. Embodiments of a method for specifying and implementing QR decomposition and other computations in a hardware efficient manner are described below.

As shown in FIG. 2A, the computer system 82 may include a display device configured to display the program as the program is created and/or executed. The display device may also be configured to display a graphical user interface or front panel of the program during execution of the program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more textual or graphical programs which are executable to implement or perform the methods described herein. For example, the memory medium may store a program, e.g., a graphical program, that specifies QR decomposition and computation of inverse matrix $R^{-1}$ and may compile the program for implementation on a circuit 83, e.g., for deployment to a programmable hardware element or for implementation on an ASIC. Additionally, the memory medium may store a graphical programming development environment application used to create and/or execute such graphical programs, e.g., the LabVIEW™ graphical program development environment, provided by National Instruments Corporation. The memory medium may also store operating system software, as well as other software for operation of the computer system. Various embodiments further include receiving or storing instructions and/or data implemented in accordance with the foregoing description upon a carrier medium.

As shown, computer system 82 may output

Figure 2B:
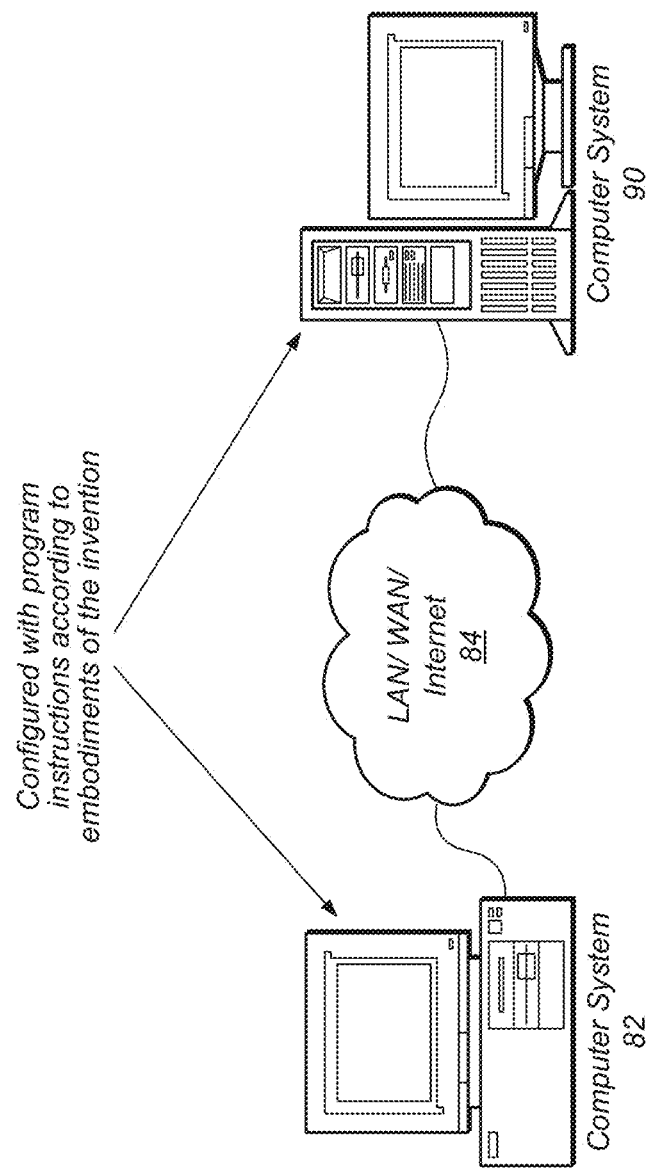
FIG. 2B illustrates a network system comprising two or more computer systems that may implement an embodiment of the present invention.

FIG. 2B—Computer Network

FIG. 2B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, in a graphical program embodiment, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element. In one embodiment, the graphical program may be deployed to and executed on the device. For example, an application development environment with which the graphical program is associated may provide support for compiling a graphical program implementing QR decomposition and computation of $R^{-1}$ as disclosed herein for deployment/implementation on the device.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the techniques disclosed herein may be used include hardware-in-the-loop testing and rapid control prototyping, among others.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 3A:
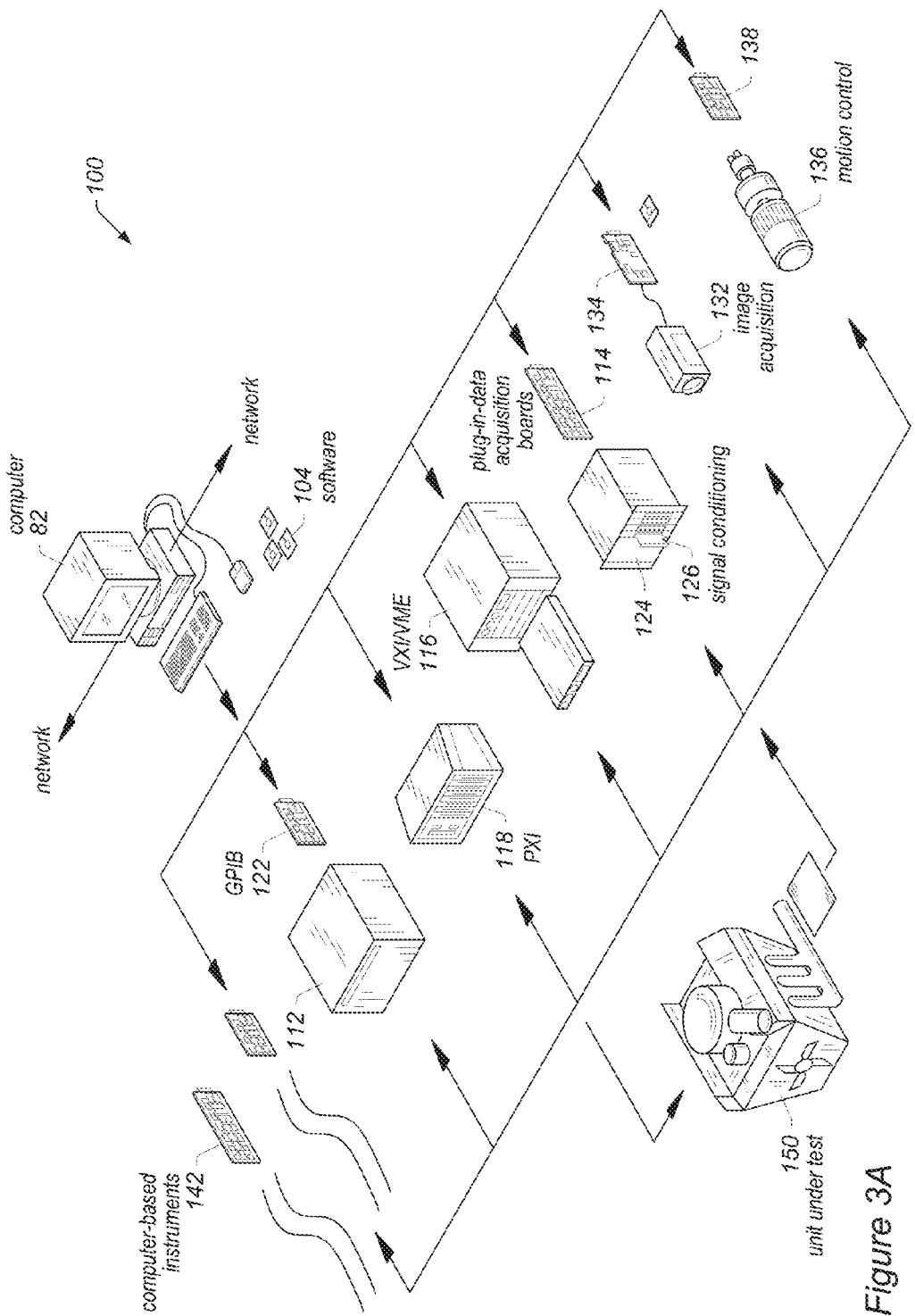
FIG. 3A illustrates an instrumentation control system according to one embodiment of the invention.

FIG. 3A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
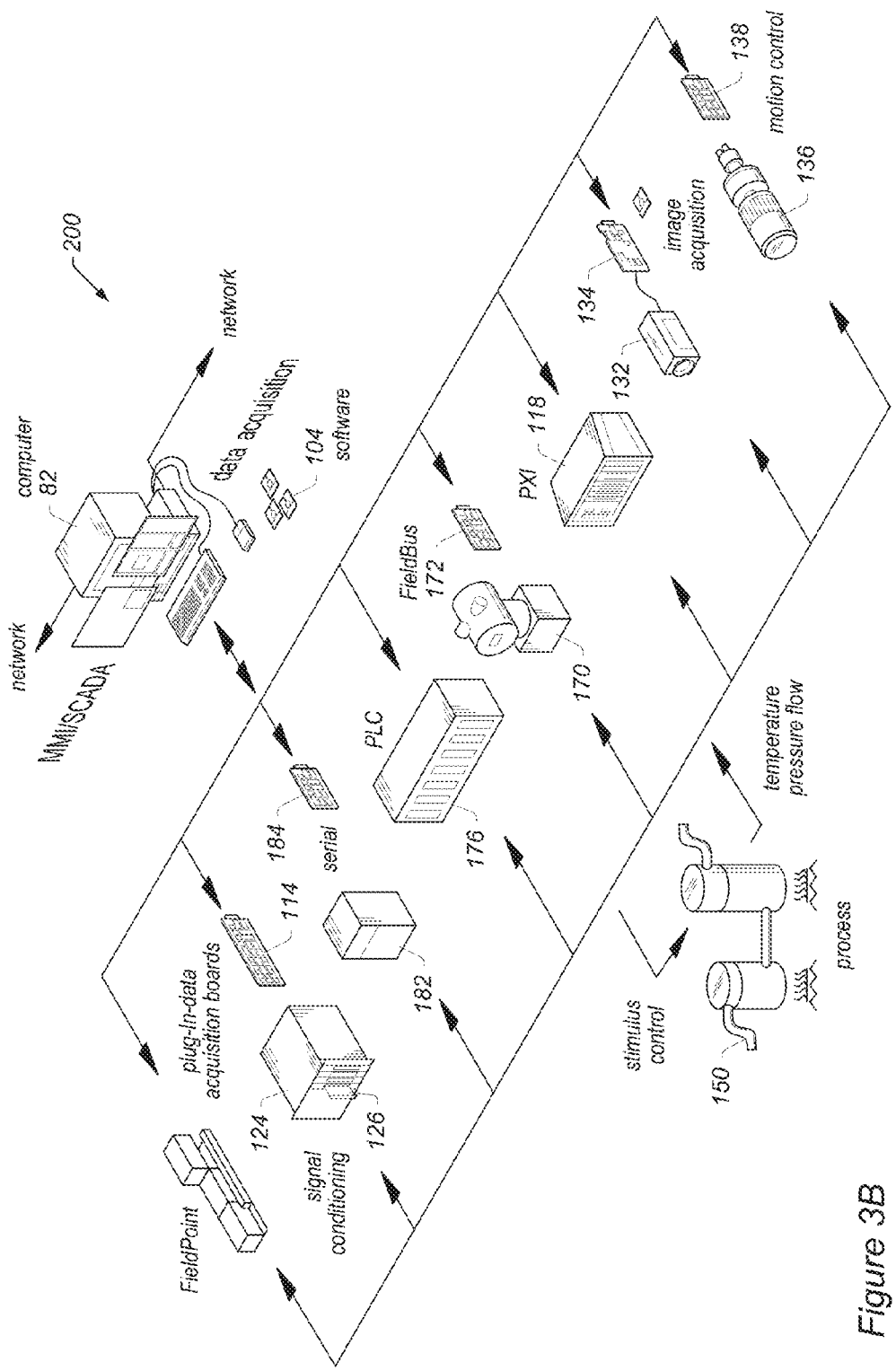
FIG. 3B illustrates an industrial automation system according to one embodiment of the invention.

FIG. 3B illustrates an exemplary industrial automation system 200 which may implement embodiments of the invention. The industrial automation system 200 is similar to the instrumentation or test and measurement system 100 shown in FIG. 3A. Elements which are similar or identical to elements in FIG. 3A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Figure 4A:
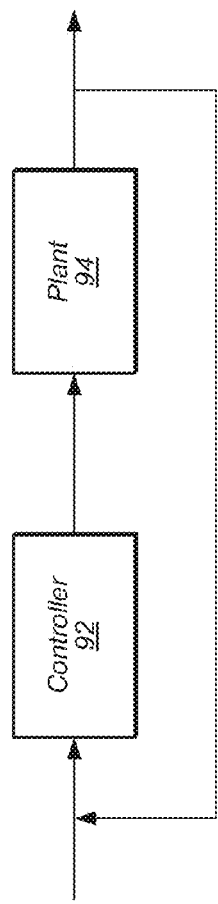
FIG. 4A is a high level block diagram of an exemplary system which may execute or utilize graphical programs.

FIG. 4A is a high level block diagram of an exemplary system which may execute or utilize graphical programs. FIG. 4A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 4B:
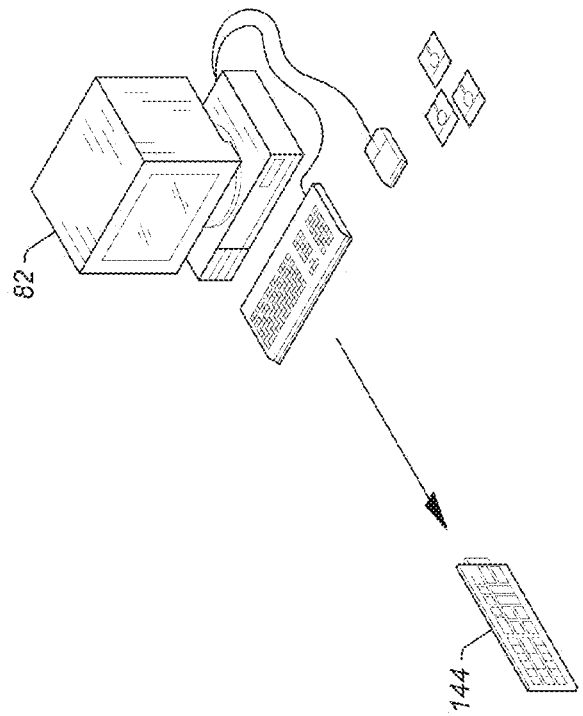
FIG. 4B illustrates an exemplary system which may perform control and/or simulation functions utilizing graphical programs.

FIG. 4B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

MGS Procedure

An interesting property of the MGS procedure can be observed via the following matrix operations, again, using a P by 4 (P×4) matrix as an example. Omitting norm and inner product calculations, the MGS procedure can be broken down into the following four steps:

$$MGS0 = \begin{bmatrix} \frac{1}{r_{00}} & 0 & 0 & 0 \\ 0 & 1 & 0 & 0 \\ 0 & 0 & 1 & 0 \\ 0 & 0 & 0 & 1 \end{bmatrix} \times \begin{bmatrix} 1 & -r_{01} & -r_{02} & -r_{03} \\ 0 & 1 & 0 & 0 \\ 0 & 0 & 1 & 0 \\ 0 & 0 & 0 & 1 \end{bmatrix} \quad (2)$$

$$MGS1 = \begin{bmatrix} 1 & 0 & 0 & 0 \\ 0 & \frac{1}{r_{11}} & 0 & 0 \\ 0 & 0 & 1 & 0 \\ 0 & 0 & 0 & 1 \end{bmatrix} \times \begin{bmatrix} 1 & 0 & 0 & 0 \\ 0 & 1 & -r_{12} & -r_{13} \\ 0 & 0 & 1 & 0 \\ 0 & 0 & 0 & 1 \end{bmatrix} \quad (3)$$

$$MGS2 = \begin{bmatrix} 1 & 0 & 0 & 0 \\ 0 & 1 & 0 & 0 \\ 0 & 0 & \frac{1}{r_{22}} & 0 \\ 0 & 0 & 0 & 1 \end{bmatrix} \times \begin{bmatrix} 1 & 0 & 0 & 0 \\ 0 & 1 & 0 & 0 \\ 0 & 0 & 1 & -r_{23} \\ 0 & 0 & 0 & 1 \end{bmatrix} \quad (4)$$

$$MGS3 = \begin{bmatrix} 1 & 0 & 0 & 0 \\ 0 & 1 & 0 & 0 \\ 0 & 0 & 1 & 0 \\ 0 & 0 & 0 & \frac{1}{r_{33}} \end{bmatrix} \times \begin{bmatrix} 1 & 0 & 0 & 0 \\ 0 & 1 & 0 & 0 \\ 0 & 0 & 1 & 0 \\ 0 & 0 & 0 & 1 \end{bmatrix} \quad (5)$$

Where $r_{ij}$ is the (i, j) element of the R matrix.

Noting the MGS is a feed forward process, elements of the R matrix may be calculated just before each MGS procedure is performed. Each MGS step may include two matrix transformations; the first being for vector normalization, and the second for orthogonalization. In a matrix form, the Q matrix can be represented and determined as:

$$Q = A \times MGS0 \times MGS1 \times MGS2 \times MGS3 \qquad (6)$$

Interestingly, if the MGS procedure is applied to matrix R, it can be easily verified that:

$$R \times MGS0 \times MGS1 \times MGS2 \times MGS3 = I \qquad (7)$$

where I is the identity matrix.
Thus, $$MGS0 \times MGS1 \times MGS2 \times MGS3 = R^{-1} \qquad (8)$$

Thus, the MGS procedure also coincides with the back substitution process to determine $R^{-1}$ from the upper triangular matrix R. Accordingly, regarding a hardware implementation, e.g., on an FPGA or ASIC, one can utilize the same circuit which generates the Q matrix to generate $R^{-1}$, simply by "piggy backing" an identity matrix following matrix A. In other words, the circuit used to determine the matrix Q can be repurposed to compute the matrix $R^{-1}$, which is useful to perform any of various other industrially useful operations or computations, e.g., for solving for pseudo inverse matrices, solving systems of unified linear equations, determining signal estimates with minimum mean square error, and so forth, among others. Note that while the present techniques are implemented using the Modified Gram Schmidt procedure, the techniques disclosed herein are also applicable to other QR decomposition schemes, e.g., the (unmodified) Gram Schmidt procedure.

Figure 5:
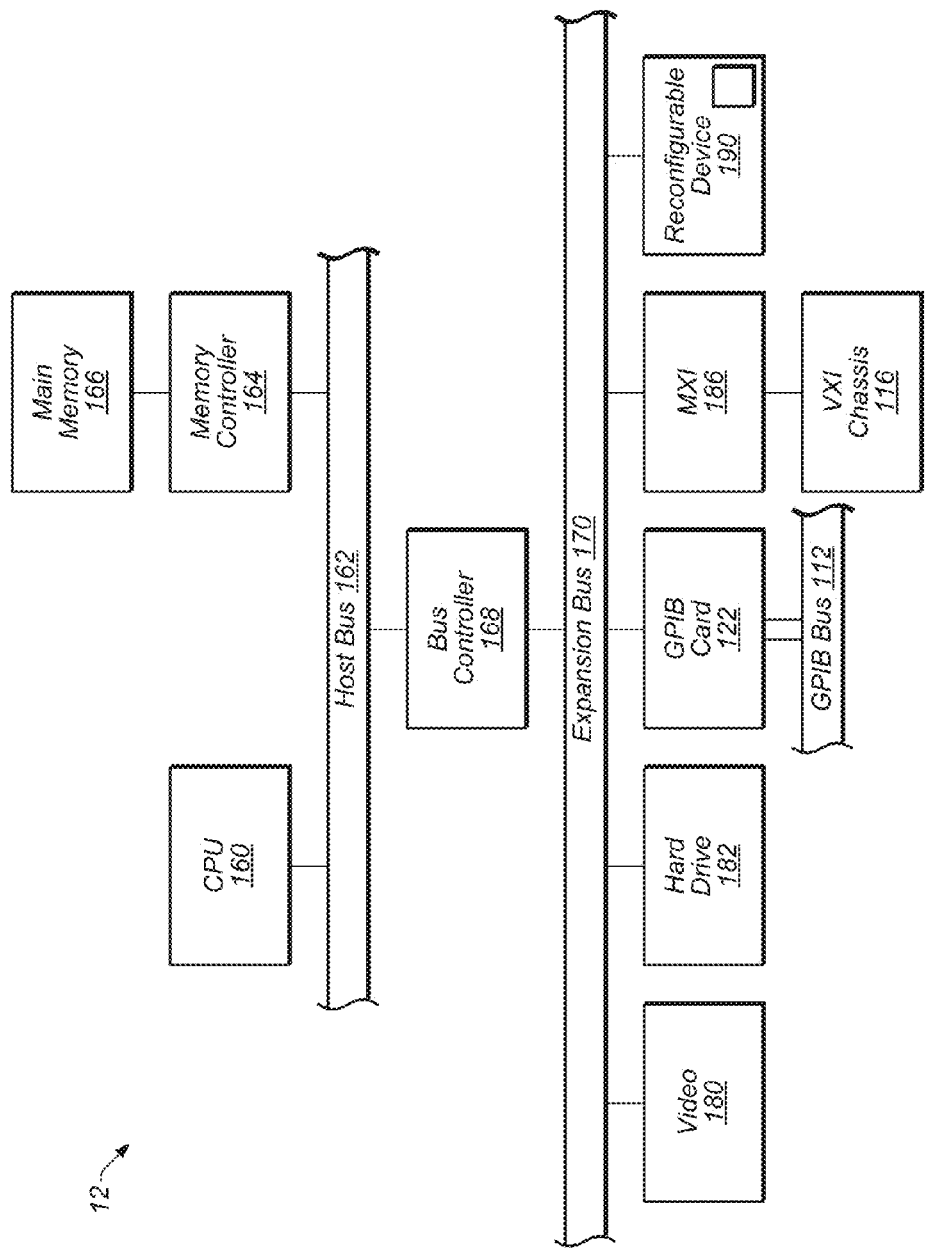
FIG. 5 is an exemplary block diagram of the computer systems of FIGS. 1A, 1B, 2A and 2B and 3B.

FIG. 5—Computer System Block Diagram

FIG. 5 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 5 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program (or other type of program) configured to specify QR decomposition and computation of inverse matrix $R^{-1}$ per the techniques disclosed herein. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. The compiled code may be further converted for implementation in hardware via any of various tools, e.g., to a netlist or other hardware configuration program, as desired.

Figure 6:
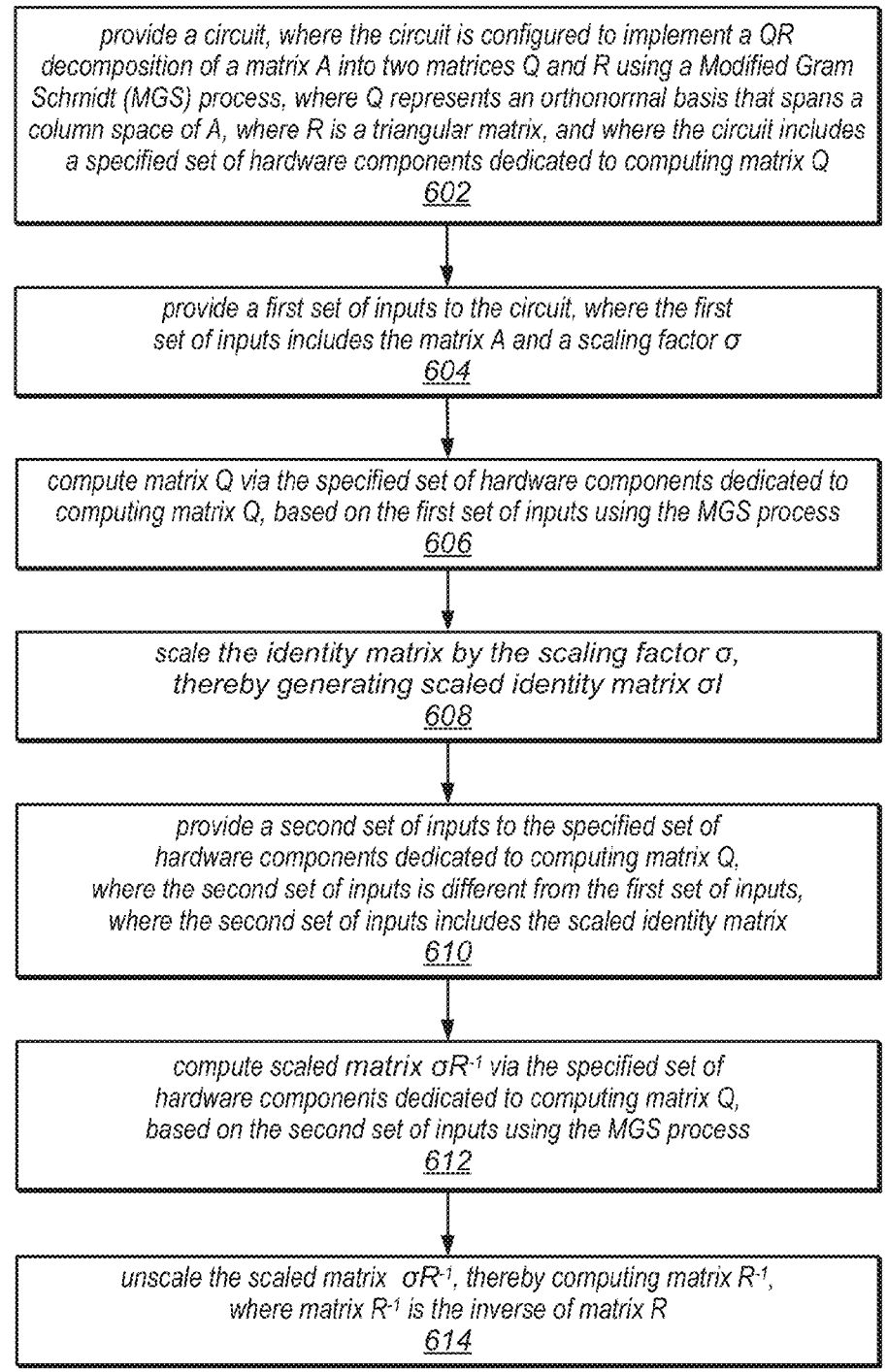
FIG. 6 is a flowchart diagram illustrating one embodiment of a method for performing a QR decomposition and computing inverse matrix $R^{-1}$.

FIG. 6—Method for Performing QR Decomposition and Computation of Inverse Matrix $R^{-1}$ FIG. 6 is a high level flowchart of a method for performing QR decomposition and computing inverse matrix $R^{-1}$, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 602, a circuit may be provided, where the circuit is configured to implement a QR decomposition of a matrix A into two matrices Q and R using a Modified Gram Schmidt (MGS) process, where Q represents an orthonormal basis that spans a column space of A, and where R is a triangular matrix. The circuit may include a specified set of hardware components dedicated to computing matrix Q. In other words, a specified portion of the circuit may be dedicated specifically to computation of the matrix Q, i.e., a particular portion of the circuit is devoted specifically to determining or computing the matrix Q.

In 604, a first set of inputs may be provided to the circuit, where the first set of inputs may include the matrix A and a scaling factor σ. In other words, the matrix A and scaling factor σ may be received to or by the circuit. Note, however, that in some embodiments, there may be no scaling, and so either no scaling factor may be provided (or it may be set to 1). In some embodiments, the first set of inputs may include additional input data, e.g., the size of the matrix A, etc., as desired.

In 606, matrix Q may be computed via the specified set of hardware components (or circuit portion) dedicated to computing matrix Q, based on the first set of inputs using the MGS process. The computed matrix Q may be output and/or stored, e.g., in a register or other memory of the circuit, or in a memory external to the circuit, e.g., for subsequent use, as described below.

In 608, the identity matrix may be scaled by the scaling factor σ, thereby generating scaled identity matrix σI. In embodiments without scaling, this method element may be omitted.

In 610, a second set of inputs may be provided to the specified set of hardware components dedicated to computing matrix Q, where the second set of inputs is different from the first set of inputs, and where the second set of inputs includes the scaled identity matrix. In other words, the specified set of hardware components (or circuit portion) dedicated to computing matrix Q may receive the second set of inputs. Of course, in embodiments without scaling, the identity matrix is not scaled. In some embodiments, the identity matrix may have been stored or even hard-wired in the circuit, and thus provided (possibly after scaling) to the specified set of hardware components dedicated to computing matrix Q from inside the circuit. In another embodiment, the identity matrix may be provided to the circuit from an external source or memory. In a further embodiment, the scaling of 608 may be performed by the specified set of hardware components (or circuit portion) dedicated to computing matrix Q, and so the specified set of hardware components (or circuit portion) may receive the unscaled identity matrix I as input, and scale it.

In 612, scaled matrix $\sigma R^{-1}$ may be computed via the specified set of hardware components dedicated to computing matrix Q, based on the second set of inputs using the MGS process.

In 614, the scaled matrix $\sigma R^{-1}$ may be unscaled, thereby computing matrix $R^{-1}$, where matrix $R^{-1}$ is the inverse of matrix R. Of course, in embodiments without scaling, this method element may be omitted. The matrix $R^{-1}$ may be output and/or stored, e.g., in a register or other memory of the circuit, or in a memory external to the circuit.

Thus, the portion of the circuit dedicated to computing matrix Q may be repurposed to compute (possibly scaled) matrix $R^{-1}$ simply by providing different input values or parameters to the portion, thus, obviating additional circuitry that would otherwise be required to compute the (possibly scaled) matrix $R^{-1}$, and thereby decreasing the footprint or size, and corresponding circuit components, and thus cost.

Figure 7B:
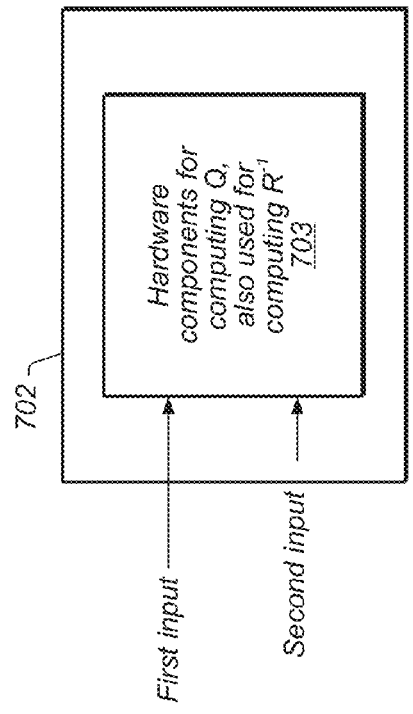
FIGS. 7A and 7B illustrate a benefit of dual purposing QR decomposition circuitry to compute inverse matrix $R^{-1}$.
Figure 7A:
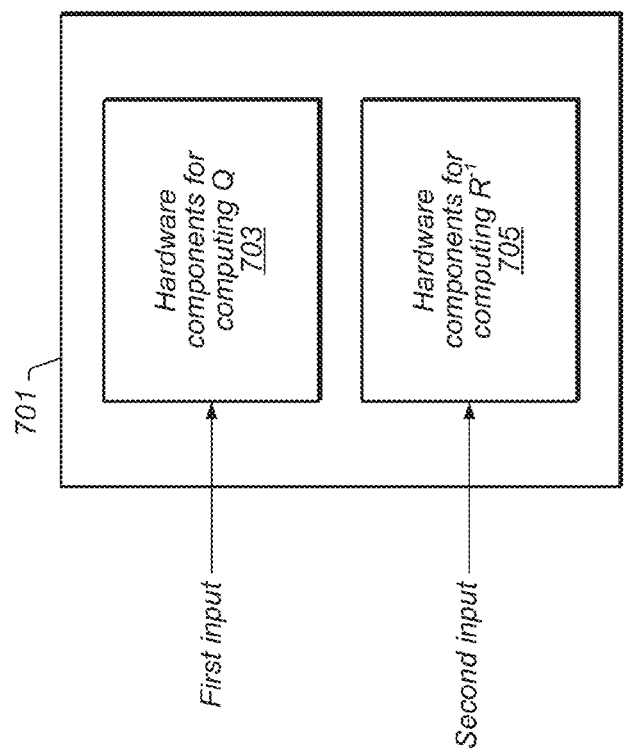

FIGS. 7A and 7B illustrate such savings according to one exemplary embodiment, where FIG. 7A shows a prior art implementation with respective circuitry for computing matrix Q (703) and matrix $R^{-1}$ (705), and where FIG. 7B shows an exemplary implementation of a circuit according to an embodiment of the present techniques, where the circuit portion 703 is used for both computations, per the above, and thus, circuit portion 705 is omitted. These benefits may be especially valuable in products such as smartphones, tablet computers, etc., where minimization of cost and size is particularly important.

Exemplary Applications

As noted above, the computed inverse matrix $R^{-1}$ may be used for a wide variety of further computations or functionalities that are technologically or industrially valuable. For example, in one embodiment, the circuit may be further configured to compute matrix $A^{-1}$ based on the matrix $R^{-1}$ and the matrix Q. Accordingly, the method may further include computing, via the circuit, matrix $A^{-1}$ based on the matrix $R^{-1}$ and the matrix Q. Such matrix inversion is broadly useful in industrial or technological applications, e.g., products and processes.

Figure 8:
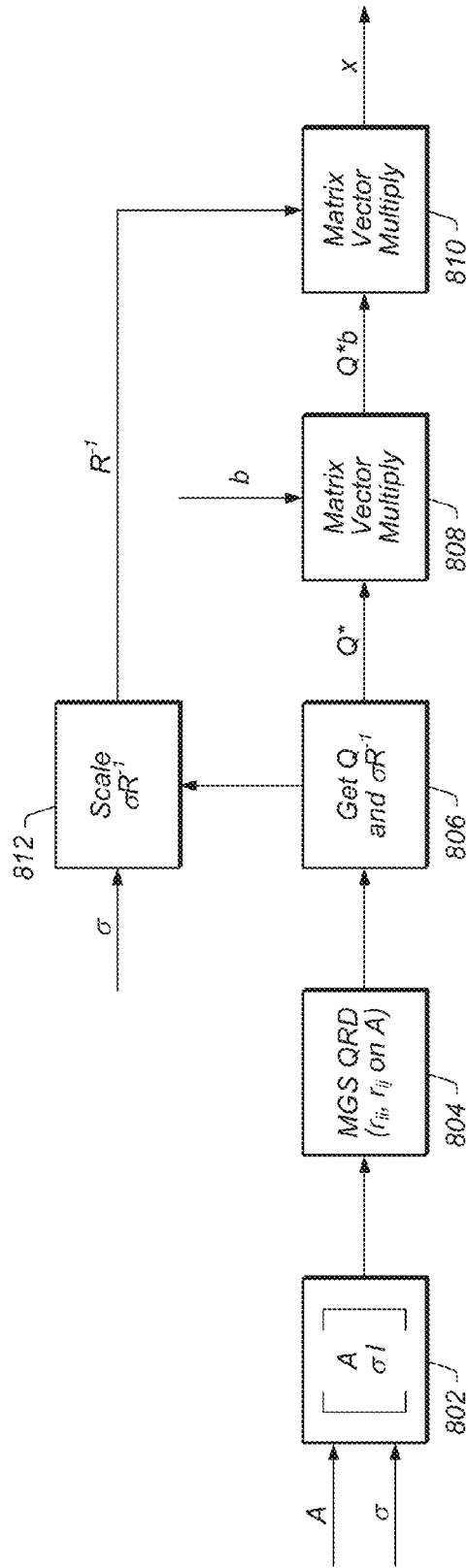
FIG. 8 is a high level flowchart of a method for solving a system of linear equations, according to one embodiment.

As another example application of the above techniques, the circuit may be further configured to solve a system of linear equations specified by the expression Ax=b, wherein x and b are respective vectors, and so the method may further include solving, via the circuit, the system of linear equations specified by the expression Ax=b to determine x, based on matrix $R^{-1}$, the matrix Q, and vector b, and where x is a vector. An exemplary flowchart of this process is shown in FIG. 8, where, as may be seen, in 802 matrix A and a scaling factor $\sigma$ may be provided as input, an extended matrix may be generated by scaling an identity matrix with the scaling factor $\sigma$ to produce extended identity matrix $\sigma I$, and matrix A may be extended by the extended identity matrix $\sigma I$, as shown. Alternatively, the inputs may be kept separate, i.e., the matrix A may not be extended by the extended identity matrix $\sigma I$.

Then, as indicated in 804, the MGS (QR decomposition) procedure may be performed on matrix A (not the extended matrix A), i.e., where the coefficients or factors $r_{ii}$ and $r_{ij}$ are applied to matrix A as described above. Matrices Q and $\sigma R^{-1}$ may be derived or extracted per 806, and $\sigma R^{-1}$ may be scaled to remove the scaling factor $\sigma$, thereby producing matrix $R^{-1}$, as indicated in 812.

Based on matrix Q from 806, Hermitian conjugate transpose (matrix) Q* may be computed from Q and multiplied by vector b, as shown in 808, and in 810, inverse matrix $R^{-1}$ may be multiplied by the product (Q*b), resulting in solution vector x.

Thus, embodiments of the circuit and techniques disclosed herein may operate to efficiently (via the MGS procedure) solve systems of linear equations.

Figure 9:
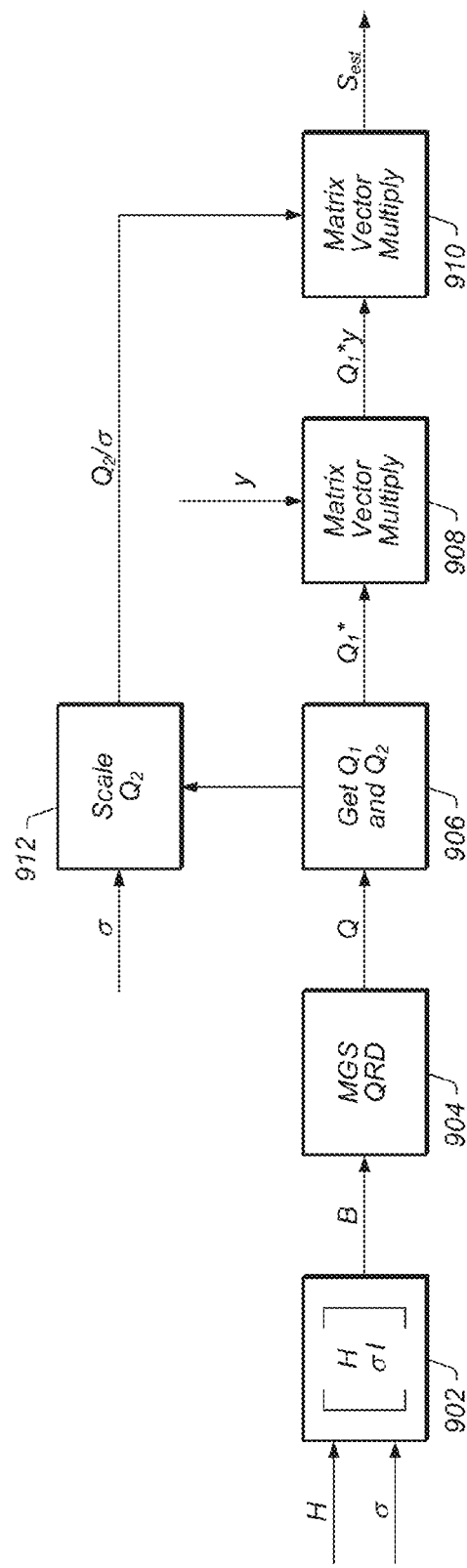
FIG. 9 is a high level flowchart of a method for estimating a signal transmitting on a noisy channel, according to one embodiment.

In a further embodiment, in being configured to solve the system of linear equations specified by the expression Ax=b, the circuit may be inherently configured to determine an estimated signal $s_{est}$ with a minimum mean square error (MMSE) with respect to an observed signal y on a noisy channel. FIG. 9 is a high level flowchart of a method for estimating a signal transmitting on a noisy channel, according to one embodiment. Note the similarities between the flowchart of FIG. 8 and that of FIG. 9, which reflect the fact that the same circuit is capable of performing both methods via different input.

Thus, in some embodiments, the method may further include receiving a third set of inputs at the input, where the third set of inputs includes a channel matrix H and in embodiments where scaling is utilized, the scaling factor $\sigma$, as shown being provided to block 902 of FIG. 9. As 902 also indicates, the identity matrix may be scaled by the scaling factor $\sigma$, thereby generating a scaled identity matrix $\sigma I$, and the channel matrix H may be extended with the scaled identity matrix $\sigma I$, thereby generating extended channel matrix B. In 904, matrix Q may then be computed (via the specified set of hardware components (or circuit portion) dedicated to computing matrix Q), based on the extended matrix B using the MGS process.

In 906, matrix Q may be partitioned into constituent matrices $Q_1$ and matrix $Q_2$, i.e., matrix Q may be divided or separated into matrix $Q_1$ and matrix $Q_2$, which may then be stored, e.g., in a memory or register of the circuit. In 912, matrix $Q_2$ may be scaled by scaling factor $\sigma$, thereby computing $Q_2/\sigma$, as shown.

In 908, based on matrix $Q_1$ from 906, Hermitian conjugate transpose (matrix) $Q_1^*$ may be computed from $Q_1$ and multiplied by vector y (observed signal), as shown in 908, and in 910, scaled matrix $Q_2/\sigma$ may be multiplied by the product ($Q_1^*y$), resulting in estimated signal $S_{est}$. In other words, the estimated signal $s_{est}$ may be computed based on $Q_1, Q_2/\sigma$, and the observed signal y. The estimated signal $s_{est}$ may be output and/or stored, e.g., in a memory or register of the circuit.

Note that both solution processes (solving linear equations, estimating signal) involve $R^{-1}$ in a similar way and may be implemented using a unified architecture in hardware, e.g., on an FPGA. Moreover, as also described above, the same implementation scheme can also be applied to compute the inverse of a matrix for some application. Thus, the MGS procedure may be used in any of various ways by embodiments of the circuit disclosed herein to efficiently perform QR decomposition and related matrix computations.

As discussed above, QR decomposition generally involves normalization and orthogonalization processes which are applied iteratively to column vectors of a matrix, e.g., matrix A. In some embodiments, a systolic array may be used to perform the MGS procedure, i.e., may be implemented by embodiments of the circuit disclosed herein. As is known, a systolic array is an array of matrix-like rows of data processing units (DPUs), referred to as cells, which can be used to parallelize computations. More specifically, a DPU is similar to a CPU (central processing unit) but generally lacks a program counter, because the DPU activates upon receipt of input data. In a systolic array, which may be rectangular in arrangement, data may flow synchronously through the array, where at each step or cycle, each cell receives data from one or more of its neighbor cells (e.g., North and East neighbor cells), computes a value, and outputs the value in the cells respectively opposite (e.g., South and West neighbor cells). Systolic arrays are often used for efficient matrix multiplication, and thus may be suitable for implementations of the techniques disclosed herein. DPUs may be referred to as process elements (PEs).

Figure 10:
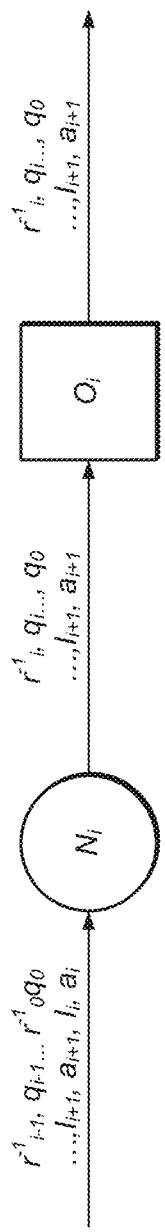
FIG. 10 illustrates normalization and orthogonalization processes for an $i^{th}$ vector, according to one embodiment.

For example, in one embodiment, a systolic array may be used or implemented in which two kinds of process elements (PE) are utilized; one type for normalization and one type for orthogonalization. As cascaded vectors pass through a normalization PE, the first vector get normalized and rest of the vectors just pass through. The orthogonalization PE uses the last normalized vector to perform orthogonalization process for sub sequential vectors. FIG. 10 illustrates normalization and orthogonalization processes for an $i^{th}$ vector which may be computed as part of the techniques disclosed herein, according to one embodiment. As shown, matrix elements for the $i^{th}$ vector (e.g., coefficients): $\bar{r}^{-1}_{i-1}, \bar{q}_{i-1} \ldots \bar{r}^{-1}_0 \bar{q}_0 \ldots, I_{i+1}, \bar{a}_{i+1}, I_i, \bar{a}_i$, may be provided as input to a normalization process $N_i$, which may produce normalized elements $\bar{r}^{-1}_i, \bar{q}_i, \ldots, \bar{q}_0 \ldots, I_{i+1}, \bar{a}_{i+1}$, as output. This output may then be provided to orthogonalization process $O_i$ as input, as shown. The orthogonalization process $O_i$, may use these inputs to produce orthogonal outputs $\bar{r}^{-1}_i, \bar{q}_i \ldots, \bar{q}_0 \ldots, I_{i+1}, \bar{a}_{i+1}$.

Note that particular implementations in hardware may be chosen based on performance and/or footprint requirements. For example, loops may be "unrolled", subprocesses may be pipelined, and so forth, to trade-off between speed and circuit size or footprint. Thus, for example, the basic elements described in FIG. 10 may be used or implemented in various ways to meet different requirements. Said another say, different architectures or implementations of a systolic array may be constructed to accommodate different throughput requirements. This flexibility may be important for some applications. For example, one can save FPGA resources (decrease the footprint) when real time throughput requirements are not high.

FIGS. 11A and 11B respectively illustrate an N×4 sequential (non-parallel) QR decomposition process and a corresponding exemplary graphical program implementation, according to one embodiment. Note that the graphical program shown was developed in the LabVIEW FPGA development system provided by National Instruments Corporation, and is compilable for and deployable to an FPGA. As may be seen, this sequential implementation saves FPGA (or more generally, circuit) footprint at the expense of speed. The following table illustrates exemplary resource use and performance for this implementation, according to one embodiment directed to a 4×4 real-valued matrix, with the core compiled with a specific output option; specifically, the core was compiled at 280 MHz on a Xilinx Virtex 5 sx95t −1 device, and Table 1 lists approximate resource utilization of the device for various applications.

TABLE 1

|  | DSP48s | registers | LUTs | Latency (cycles) | Latency (time, μs) |
|---|---|---|---|---|---|
| Q, R | 38 | 2444(4.2%) | 3109(5.2%) | 114 | 0.4 |
| Q, R, R$^{-1}$ | 41 | 2672(4.5%) | 3421(5.8%) | 103 | 0.36 |
| MMSE | 37 | 2041(3.5%) | 2464(4.2%) | 131 | 0.46 |

Figure 12A:
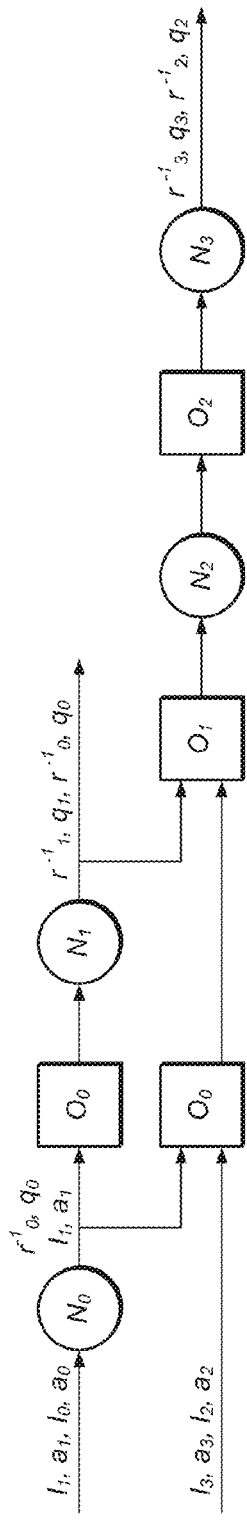
FIGS. 12A and 12B respectively illustrate an N×4 semi-parallel QR decomposition process and a corresponding graphical program implementation, according to one embodiment.
Figure 12B:
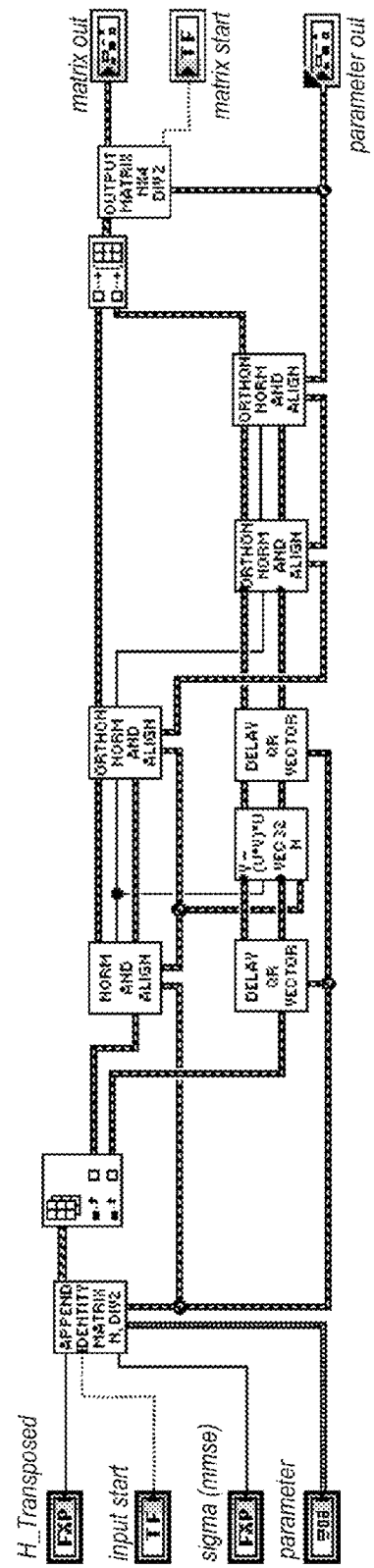
Figure 13A:
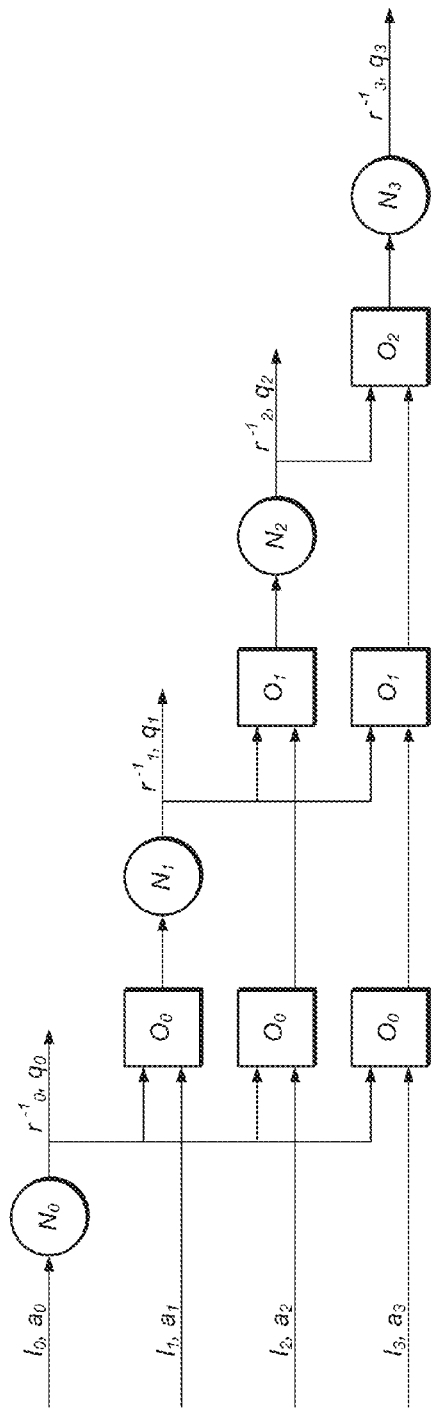
FIGS. 13A and 13B respectively illustrate an N×4 full parallel QR decomposition process and a corresponding graphical program implementation, according to one embodiment.
Figure 13B:
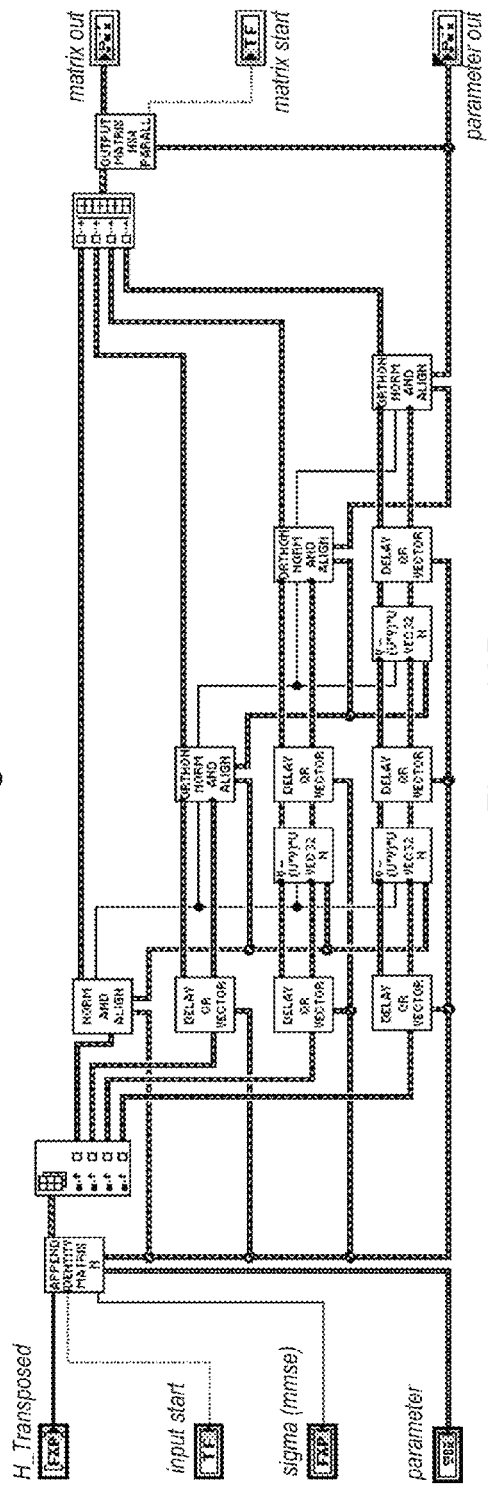

FIGS. 12A and 12B respectively illustrate an N×4 semi-parallel QR decomposition process and a corresponding graphical program implementation, according to one embodiment, and FIGS. 13A and 13B respectively illustrate an N×4 full parallel QR decomposition process and a corresponding graphical program implementation, according to one embodiment.

Clearly, as the circuit implements more parallelism, more circuit resources are required, but the throughput of the circuit is increased. Thus, the circuit may be implemented in different ways depending on the particular requirements of an application. Thus, in some embodiments, the circuit may implement a systolic array to perform the MGS process. Moreover, in various embodiments, the systolic array may be implemented to perform the MGS process based on one or more of a specified throughput requirement or a specified footprint requirement.

Additionally, as discussed above, in some embodiments, the circuit may include or be implemented by an application specific integrated circuit (ASIC), and in other embodiments, may include or be implemented by a programmable hardware element, such as an FPGA.

As exemplified by FIGS. 11B, 12B, and 13B, in some embodiments, the above techniques or functionality may be specified by graphical programs, e.g., LabVIEW programs, although any other type of program may be used as desired.

In some embodiments where the functionality is specified by a graphical program, the graphical program may be created on the computer system 82 (or on a different computer system). The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicates the functionality of the program. As noted above, the graphical program may comprise a block diagram and may also include a user interface portion or front panel portion. Where the graphical program includes a user interface portion, the user may optionally assemble the user interface on the display. As one example, the user may use the Lab-VIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement or analysis or processing function that is desired to be performed by the instrument.

In a further embodiment, a software tool may be provided whereby a user may specify the above described functionality, and the software tool may automatically generate a program, e.g., a graphical program, that encodes or implements the functionality targeted for deployment to hardware. For example, in one embodiment, a program development environment may be provided that allows a user to select a function for inclusion in a program, and provide input configuring the function for a specific QR decomposition application. The development environment (or more generally, the software tool) may then automatically generate a program (e.g., a subprogram) that implements the specified functionality.

In some embodiments, the development environment may be a graphical development environment, e.g., similar to, or a version of, LabVIEW FPGA™, provided by National Instruments Corporation, that has been adapted appropriately to implement embodiments of the techniques disclosed herein. For example, in one embodiment, a node may be provided, e.g., in a palette, which the user may select for inclusion in a graphical program, e.g., the user may drag and drop the node into the graphical program. For convenience, the node may be referred to herein as a QR node, although any other name or label may be used as desired. In LabVIEW parlance, the QR node may be a subVI, which is a callable graphical program node representing another graphical program, where the other graphical program implements the desired functionality represented by the node/subVI. In other words, the term "subVI" is a graphical node that corresponds to a textual subprogram that is callable by a program. The user may configure the QR node for the particular application in mind, e.g., by invoking a GUI, such as by right clicking on the node, or any other mechanism as desired, and providing input specifying various attributes or parameters for the desired functionality, e.g., array or matrix size(s) or dimensionality, scaling, throughput requirements, e.g., degree of parallelism, and so forth, as appropriate. Once the node is configured, the software tool, e.g., the graphical development environment, or a separate tool, e.g., configured to operate in conjunction with the environment, may automatically generate a graphical program in accordance with the user-specified configuration.

In another embodiment, the software tool may be or include a wizard that may present a series of dialogs or fields to receive user input specifying the desired functionality, e.g., array size(s) or dimensionality, scaling, etc., and the program (e.g., textual or graphical) may be generated accordingly.

Example graphical programs implementing such functionality are described above with respect to FIGS. 11B, 12B, and 13B, although it should be noted that these programs are exemplary only.

The generated (possibly graphical) program may be used to generate (e.g., may be converted or compiled to produce) a hardware configuration program or netlist or circuit design/layout program or file, which may then be used to implement embodiments of the techniques disclosed herein in hardware, i.e., in or on a circuit, such as a programmable hardware element, e.g., an FPGA, or an ASIC.

It should be noted that in various embodiments, any of the techniques or elements described herein may be used in any combinations desired.

Attached hereto is an Appendix comprising a white paper titled "A Novel Architecture for QR Decomposition" by Yong Rao and Ian Wong, of National Instruments Corporation, which is hereby incorporated by reference in its entirety as though fully and completely set forth herein.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A circuit, configured to implement a QR decomposition of a matrix A into two matrices Q and R using a Modified Gram Schmidt (MGS) process, wherein Q represents an orthonormal basis that spans a column space of A, and wherein R is a triangular matrix, the circuit comprising:
an input;
a specified set of hardware components, coupled to the input, wherein the specified set of hardware components are dedicated to computing matrix Q; and
an output;
wherein the circuit is configured to:
receive a first set of inputs at the input, wherein the first set of inputs includes the matrix A and a scaling factor σ;
compute matrix Q via the specified set of hardware components dedicated to computing matrix Q, based on the first set of inputs using the MGS process;
scale the identity matrix by the scaling factor σ, thereby generating scaled identity matrix σI;
receive a second set of inputs to the specified set of hardware components dedicated to computing matrix Q, wherein the second set of inputs is different from the first set of inputs, wherein the second set of inputs comprises the scaled identity matrix;
compute scaled matrix $\sigma R^{-1}$ via the specified set of hardware components dedicated to computing matrix Q, based on the second set of inputs using the MGS process;
unscale the scaled matrix $\sigma R^{-1}$, thereby computing matrix $R^{-1}$, wherein matrix $R^{-1}$ is the inverse of matrix R;
output the matrix Q and/or matrix $R^{-1}$ via the output; and
use the matrix Q and/or matrix $R^{-1}$ to perform signal estimation on a noisy channel.

2. The circuit of claim 1, wherein the circuit is further configured to:
compute matrix $A^{-1}$ based on the matrix $R^{-1}$ and the matrix Q.

3. The circuit of claim 1, wherein the circuit is further configured to solve a system of linear equations specified by the expression Ax=b based on the matrix $R^{-1}$, the matrix Q, and vector b, and wherein x is a vector.

4. The circuit of claim 3, wherein in being configured to solve the system of linear equations specified by the expression Ax=b, the circuit is inherently configured to determine an estimated signal $s_{est}$ with a minimum mean square error (MMSE) with respect to an observed signal y on a noisy channel, wherein to determine the estimated signal $s_{est}$ the circuit is configured to:
receive a third set of inputs at the input, wherein the third set of inputs includes a channel matrix H and the scaling factor σ;
scale the identity matrix by the scaling factor σ, thereby generating a scaled identity matrix σI;
extend the channel matrix H with the scaled identity matrix σI, thereby generating extended channel matrix B;
compute matrix Q via the specified set of hardware components dedicated to computing matrix Q, based on the extended matrix B using the MGS process;
divide matrix Q into matrix $Q_1$ and matrix $Q_2$;

store the matrix $Q_1$ and matrix $Q_2$;
scale matrix $Q_2$ by $\sigma$, thereby computing $Q_2/\sigma$; and
compute the estimated signal $s_{est}$ based on $Q_1$, $Q_2/\sigma$, and the observed signal y; and
output the estimated signal $s_{est}$.

5. The circuit of claim 1, wherein the circuit comprises an application specific integrated circuit (ASIC).

6. The circuit of claim 1, wherein the circuit comprises a programmable hardware element.

7. The circuit of claim 1, wherein the circuit implements a systolic array to perform the MGS process.

8. The circuit of claim 7, wherein the systolic array is implemented to perform the MGS process based on one or more of:
  a specified throughput requirement; or
  a specified footprint requirement.

9. A method, comprising:
  providing a circuit, wherein the circuit is configured to implement a QR decomposition of a matrix A into two matrices Q and R using a Modified Gram Schmidt (MGS) process, wherein Q represents an orthonormal basis that spans a column space of A, wherein R is a triangular matrix, and wherein the circuit comprises a specified set of hardware components dedicated to computing matrix Q;
  providing a first set of inputs to the circuit, wherein the first set of inputs includes the matrix A and a scaling factor $\sigma$;
  computing matrix Q via the specified set of hardware components dedicated to computing matrix Q, based on the first set of inputs using the MGS process;
  storing the matrix Q;
  scaling the identity matrix by the scaling factor $\sigma$, thereby generating scaled identity matrix $\sigma I$;
  providing a second set of inputs to the specified set of hardware components dedicated to computing matrix Q, wherein the second set of inputs is different from the first set of inputs, wherein the second set of inputs comprises the scaled identity matrix;
  computing scaled matrix $\sigma R^{-1}$ via the specified set of hardware components dedicated to computing matrix Q, based on the second set of inputs using the MGS process;
  unscaling the scaled matrix $\sigma R^{-1}$, thereby computing matrix $R^{-1}$, wherein matrix $R^{-1}$ is the inverse of matrix R;
  storing the matrix $R^{-1}$; and
  using the matrix Q and/or matrix $R^{-1}$ to perform signal estimation on a noisy channel.

10. The method of claim 9, wherein the circuit is further configured to compute matrix $A^{-1}$ based on the matrix $R^{-1}$ and the matrix Q, the method further comprising:
  computing, via the circuit, matrix $A^{-1}$ based on the matrix $R^{-1}$ and the matrix Q.

11. The method of claim 9, wherein the circuit is further configured to solve a system of linear equations specified by the expression Ax=b, wherein x and b are respective vectors, the method further comprising:
  solving, via the circuit, the system of linear equations specified by the expression Ax=b to determine x, based on matrix $R^{-1}$, the matrix Q, and vector b, and wherein x is a vector.

12. The method of claim 11, wherein in being configured to solve the system of linear equations specified by the expression Ax=b, the circuit is inherently configured to determine an estimated signal $s_{est}$ with a minimum mean square error (MMSE) with respect to an observed signal y on a noisy channel, the method further comprising:
  receiving a third set of inputs at the input, wherein the third set of inputs includes a channel matrix H and the scaling factor $\sigma$;
  scaling the identity matrix by the scaling factor $\sigma$, thereby generating a scaled identity matrix $\sigma I$;
  extending the channel matrix H with the scaled identity matrix $\sigma I$, thereby generating extended channel matrix B;
  computing matrix Q via the specified set of hardware components dedicated to computing matrix Q, based on the extended matrix B using the MGS process;
  dividing matrix Q into matrix $Q_1$ and matrix $Q_2$;
  storing the matrix $Q_1$ and matrix $Q_2$;
  scaling matrix $Q_2$ by $\sigma$, thereby computing $Q_2/\sigma$; and
  computing the estimated signal $s_{est}$ based on $Q_1$, $Q_2/\sigma$, and the observed signal y; and
  outputting the estimated signal $s_{est}$.

13. The method of claim 9, wherein the circuit comprises an application specific integrated circuit (ASIC).

14. The method of claim 9, wherein the circuit comprises a programmable hardware element.

15. The method of claim 9, wherein the circuit implements a systolic array to perform the MGS process.

16. The method of claim 15, wherein the systolic array is implemented to perform the MGS process based on one or more of:
  a specified throughput requirement; or
  a specified footprint requirement.

17. A circuit, configured to implement a QR decomposition of a matrix A into two matrices Q and R using a Modified Gram Schmidt (MGS) process, wherein Q represents an orthonormal basis that spans a column space of A, and wherein R is a triangular matrix, the circuit comprising:
  an input;
  a specified set of hardware components, coupled to the input, wherein the specified set of hardware components are dedicated to computing matrix Q; and
  an output;
  wherein the circuit is configured to:
    receive a first set of inputs at the input, wherein the first set of inputs includes the matrix A;
    compute matrix Q via the specified set of hardware components dedicated to computing matrix Q, based on the first set of inputs using the MGS process;
    receive a second set of inputs to the specified set of hardware components dedicated to computing matrix Q, wherein the second set of inputs is different from the first set of inputs, wherein the second set of inputs comprises the identity matrix;
    compute matrix $R^{-1}$ via the specified set of hardware components dedicated to computing matrix Q, based on the second set of inputs using the MGS process, wherein matrix $R^{-1}$ is the inverse of matrix R;
    output the matrix Q and/or matrix $R^{-1}$ via the output; and
    use the matrix Q and/or matrix $R^{-1}$ to perform signal estimation on a noisy channel.

18. The circuit of claim 17, wherein the circuit is further configured to:
  compute matrix $A^{-1}$ based on the matrix $R^{-1}$ and the matrix Q.

19. The circuit of claim 17, wherein the circuit is further configured to solve a system of linear equations specified by the expression Ax=b based on the matrix $R^{-1}$, the matrix Q, and vector b, and wherein x is a vector.

20. The circuit of claim 19, wherein in being configured to solve the system of linear equations specified by the expression Ax=b, the circuit is inherently configured to determine an estimated signal $s_{est}$ with a minimum mean square error (MMSE) with respect to an observed signal y on a noisy channel, wherein to determine the estimated signal $s_{est}$ the circuit is configured to:
  receive a third set of inputs at the input, wherein the third set of inputs includes a channel matrix H and a scaling factor σ;
  scale the identity matrix by the scaling factor σ, thereby generating a scaled identity matrix σI;
  extend the channel matrix H with the scaled identity matrix σI, thereby generating extended channel matrix B;
  compute matrix Q via the specified set of hardware components dedicated to computing matrix Q, based on the extended matrix B using the MGS process;
  divide matrix Q into matrix $Q_1$ and matrix $Q_2$;
  store the matrix $Q_1$ and matrix $Q_2$;
  scale matrix $Q_2$ by σ, thereby computing $Q_2/σ$; and
  compute the estimated signal $s_{est}$ based on $Q_1$, $Q_2/σ$, and the observed signal y; and
  output the estimated signal $s_{est}$.

21. A method, comprising:
  providing a circuit, wherein the circuit is configured to implement a QR decomposition of a matrix A into two matrices Q and R using a Modified Gram Schmidt (MGS) process, wherein Q represents an orthonormal basis that spans a column space of A, wherein R is a triangular matrix, and wherein the circuit comprises a specified set of hardware components dedicated to computing matrix Q;
  providing a first set of inputs to the circuit, wherein the first set of inputs includes the matrix A;
  computing matrix Q via the specified set of hardware components dedicated to computing matrix Q, based on the first set of inputs using the MGS process;
  storing the matrix Q;
  providing a second set of inputs to the specified set of hardware components dedicated to computing matrix Q, wherein the second set of inputs is different from the first set of inputs, wherein the second set of inputs comprises the identity matrix;
  computing matrix $R^{-1}$ via the specified set of hardware components dedicated to computing matrix Q, based on the second set of inputs using the MGS process, wherein matrix $R^{-1}$ is the inverse of matrix R;
  storing the matrix $R^{-1}$; and
  use the matrix Q and/or matrix $R^{-1}$ to perform signal estimation on a noisy channel.

22. The method of claim 21, wherein the circuit is further configured to compute matrix $A^{-1}$ based on the matrix $R^{-1}$ and the matrix Q, the method further comprising:
  computing, via the circuit, matrix $A^{-1}$ based on the matrix $R^{-1}$ and the matrix Q.

23. The method of claim 21, wherein the circuit is further configured to solve a system of linear equations specified by the expression Ax=b, wherein x and b are respective vectors, the method further comprising:
  solving, via the circuit, the system of linear equations specified by the expression Ax=b to determine x, based on matrix $R^{-1}$, the matrix Q, and vector b, and wherein x is a vector.

24. The method of claim 23, wherein in being configured to solve the system of linear equations specified by the expression Ax=b, the circuit is inherently configured to determine an estimated signal $s_{est}$ with a minimum mean square error (MMSE) with respect to an observed signal y on a noisy channel, the method further comprising:
  receiving a third set of inputs at the input, wherein the third set of inputs includes a channel matrix H and a scaling factor σ;
  scaling the identity matrix by the scaling factor σ, thereby generating a scaled identity matrix σI;
  extending the channel matrix H with the scaled identity matrix σ, thereby generating extended channel matrix B;
  computing matrix Q via the specified set of hardware components dedicated to computing matrix Q, based on the extended matrix B using the MGS process;
  dividing matrix Q into matrix $Q_1$ and matrix $Q_2$;
  storing the matrix $Q_1$ and matrix $Q_2$;
  scaling matrix $Q_2$ by σ, thereby computing $Q_2/σ$; and
  computing the estimated signal $s_{est}$ based on $Q_1$, $Q_2/σ$, and the observed signal y; and
  outputting the estimated signal $s_{est}$.

* * * * *